Oct. 12, 1948.     A. J. WAYMAN     2,451,421
COUPLING DEVICE
Filed July 5, 1945
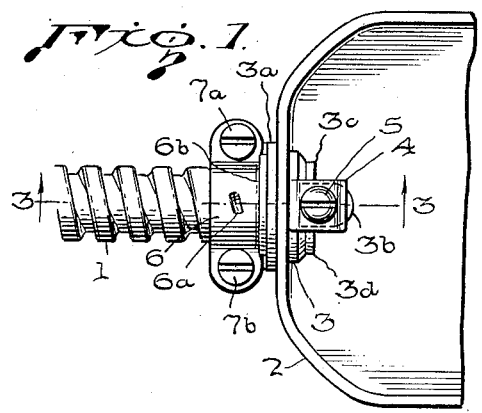
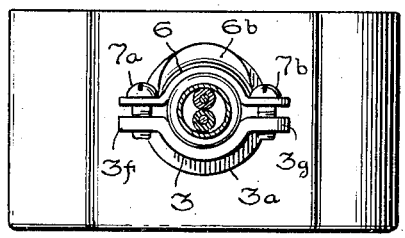
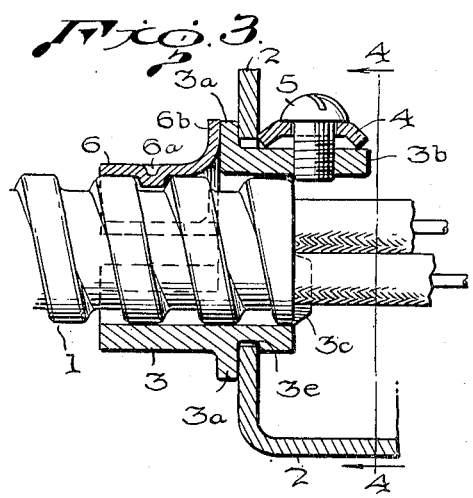
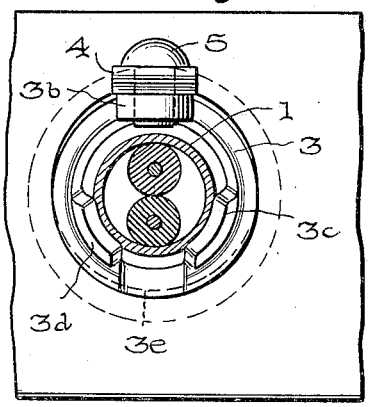
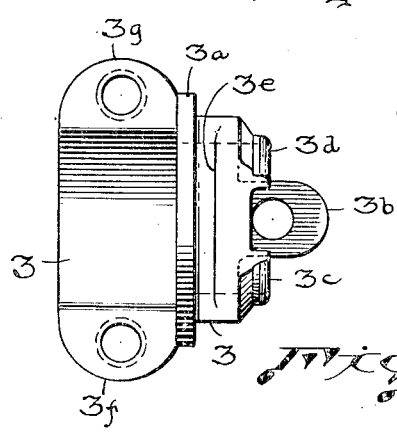
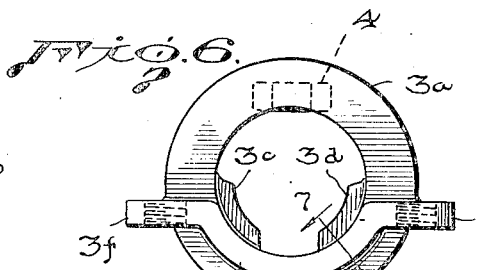
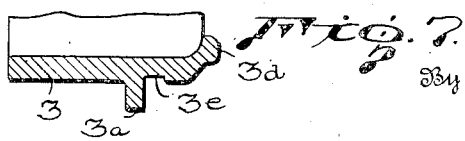
Inventor
ALBERT J. WAYMAN
By Ralph B. Stewart
Attorney Patented Oct. 12, 1948

2,451,421

UNITED STATES PATENT OFFICE 2,451,421

COUPLING DEVICE

Albert J. Wayman, Youngstown, Ohio

Application July 5, 1945, Serial No. 603,335

9 Claims. (Cl. 285—6.5)

This invention relates to coupling devices especially useful for coupling electric conduits, such as the "BX" type of conduit, with outlet boxes or other fixtures where the conduit must be coupled with a plate element of the fixture.

An object of the invention is to devise a coupling device of simple structure which is economical in the use of materials and parts.

A further object is to devise a conduit coupling which does not use a clamping nut and which may be easily applied with nothing more than a screwdriver.

Still another object is to devise a conduit coupling in which all of the parts remain in assembled relation at all times and it is not necessary to disconnect any part from the assembly in applying or removing the coupling.

The preferred construction of my coupling device is illustrated in the accompanying drawing in which Figure 1 is a plan view showing the coupling applied for coupling a BX cable to an outlet box;

Figure 2 is an elevational view of Figure 1 as seen along the axis of the cable;

Figure 3 is an enlarged sectional view of Figure 1 taken along the line 3—3;

Figure 4 is a view of Figure 3 taken along the line 4—4;

Figure 5 is an enlarged bottom view of the coupling device alone;

Figure 6 is an enlarged end view of the coupling device; and

Figure 7 is a sectional view of Figure 6 taken along the line 7—7.

Referring to the drawing, Figure 1 shows the coupling as applied for coupling a BX cable 1 to an outlet box 2, although it will be understood that the coupling may be used for coupling the cable to a plate portion of any other type of fixture. The coupling is formed of a sleeve 3, preferably a cast metal sleeve, having a radial flange or ring 3a formed around the sleeve at a point intermediate the ends thereof. The forward end of the sleeve extends through a round hole formed in the wall of the box 2 and the flange 3a abuts against the outer face of the wall of the box. The hole in the box 2 is larger than the outside diameter of the sleeve 3 but smaller than the diameter of the flange 3a. A longitudinally extending lug 3b is formed on the front end of the sleeve 3 at the upper portion thereof and extends into the box 2. A locking piece in the form of a bowed clamping piece 4, preferably formed of spring steel, is mounted on top of the lug 3b and is held in position on the lug by means of a screw 5 which passes freely through a hole formed therein and has threaded engagement with the lug 3b. The screw 5 also serves to flatten out the clamping piece 4 and to press one end thereof into engagement with the wall of the box 2 and thereby clamp the wall against the flange 3a.

As shown in Figure 3, the inner bore of the sleeve 3 is sufficiently large to receive a standard BX cable 1, the coupling being made in various sizes to suit different cable sizes. A pair of inwardly inclined lugs or flanges 3c and 3d are formed in the front end of the sleeve 3 and serve as stops to prevent the cable 1 from passing entirely through the sleeve. For the purpose of obtaining a more secure locking of the sleeve within the hole of the outlet box, a shallow groove 3e is formed on the front end of the sleeve 3 adjacent the flange 3a and around the bottom portion only of the sleeve. As shown in Figure 3, this groove forms a seat for the sleeve when mounted in the hole of the box and locks the lower part of the sleeve within the hole. The upper part of the sleeve is locked by means of the clamping piece 4. The groove 3e is not essential but is preferred.

On the rear side of the flange 3a, the sleeve 3 extends around only a part of the cable at the bottom of the coupling and is provided with a pair of laterally extending lugs 3f and 3g, see Figures 2, 5 and 6. The rear portion of the sleeve is completed by means of a bowed clamping strap 6 which is clamped to sleeve 3 by means of two screws 7a and 7b having threaded engagement with lugs 3f and 3g, respectively. It will be understood that the cable 1 is clamped within the sleeve by means of the strap 6. A detent or depression 6a is formed in the upper middle portion of the strap 6 for the purpose of forming a projection on the inner face of the strap which extends into the groove or valley formed between adjacent convolutions of the cable 1 as shown in Figure 3 and locks the cable against being pulled out of the coupling. The strap 6 is preferably stamped and formed from sheet metal and is provided with a radially extending flange 6b which serves to add strength to the strap transversely thereof.

The manner of use of the coupling is believed to be clear from the foregoing description. Figure 3 shows the coupling applied in operative position with the clamping piece 4 pressing the wall of the box 2 against the flange 3a. The cable 1 may be removed from the coupling without removing the coupling from the box simply by loosening the screws 7a and 7b and withdrawing the cable from the sleeve. The coupling may be disconnected from the box simply by loosening the screw 5 and raising the coupling vertically upward until the lower front end of the sleeve will clear the bottom edge of the hole in the box, and by rotating the coupling in a clockwise direction (as shown in Figure 3) the coupling may be withdrawn from the box without removing the screw 5 from its connection with the lug 3b. In a like manner, the coupling may be inserted in the hole in the box with all of its elements in assembled relation by first introducing the front end of the sleeve into the hole with the rear end inclined upwardly until the flange 3a comes into contact with the wall of the box, then moving the coupling upwardly until the upper part of the sleeve comes into contact with the upper wall of the hole, and then lowering the rear end of the sleeve until all parts of the flange 3a abut against the wall of the casing. The coupling is now allowed to move downwardly until the lower edge of the hole becomes seated in the groove 3e, and then the coupling is clamped in position by screwing down the screw 5.

From the foregoing it will be seen that my coupling device is a very simple construction involving only three separate parts and three clamping screws, that is, the cast sleeve 3, the clamping piece 4 and the strap 6 together with clamping screws 5, 7a and 7b. The coupling is so constructed that it may be applied and removed with all parts remaining in assembled position, and the only tool required is a simple screwdriver.

While I have shown my coupling device used for coupling a conduit with the apertured plate portion of an outlet box, it will be obvious that the coupling may be applied to an apertured plate element of any other type of fixture.

I claim:

1. A conduit coupling comprising a sleeve having a radial flange formed intermediate the ends thereof, a longitudinally extending lug formed on one end of said sleeve, a bowed clamping piece mounted on said lug and having one end thereof extending towards said flange, and a screw having threaded engagement with said lug transversely thereof and arranged to flatten out said clamping piece, whereby said end of said clamping piece moves closer to said flange.

2. A device for coupling a conduit with an apertured plate comprising a sleeve having a radial flange formed intermediate the ends thereof, a longitudinally extending lug formed at one end of said sleeve, a shallow groove formed in a portion of said sleeve diametrically opposite from said lug and adjacent said flange and serving as a seat for the edge of said plate on one side of said aperture, a locking piece carried by said lug, and a screw having threaded engagement with said lug transversely thereof and arranged to move said locking piece into engagement with said plate.

3. A device for coupling a conduit with an apertured plate element comprising a sleeve for receiving said conduit in the bore thereof, one end of said sleeve extending through the aperture in said plate and having an inwardly extending flange serving as a stop for the end of said conduit, a radial flange formed on said sleeve adjacent one face of said plate, a longitudinally extending lug formed on the end of said sleeve extending through said plate, and locking means carried by said lug for locking said sleeve to said plate.

4. A device for coupling a conduit to an apertured plate comprising a sleeve for receiving said conduit in the bore thereof, one end of said conduit extending into the aperture of said plate and having an inwardly extending flange serving as a stop for the end of said conduit, a radial flange formed on said sleeve adjacent one face of said plate, a shallow groove formed around a portion of said sleeve adjacent said flange for receiving a portion of the edge of said aperture, a longitudinally extending lug formed on the end of said sleeve extending through said aperture at a point opposite said shallow groove, and locking means carried by said lug for locking said sleeve to said plate.

5. A device for coupling a BX cable with an apertured plate comprising a sleeve for receiving said cable in the bore thereof, a radial flange formed on said sleeve intermediate the ends thereof, one end of said sleeve extending through the aperture in said plate, means for locking said sleeve to said plate, and means for clamping said cable in said sleeve comprising a bowed strap forming a portion of said sleeve on the opposite side of said flange from said plate, said strap having a radially extending flange over the major portion thereof, and means for clamping said strap to the complemental portion of said sleeve.

6. A device for coupling a conduit with an apertured plate element comprising a sleeve for receiving said conduit in the bore thereof, one end of said sleeve extending through the aperture in said plate and having an inwardly extending flange serving as a stop for the end of said conduit, a radial flange formed on said sleeve adjacent one face of said plate, a longitudinally extending lug formed on the end of said sleeve extending through said plate, and clamping means carried by said lug for clamping said plate against said flange.

7. A conduit coupling comprising a sleeve having a radial flange formed intermediate the ends thereof, a bowed clamping piece mounted on said sleeve in spaced relation to said flange, and a screw having threaded engagement with said sleeve transversely thereof and arranged to flatten out said clamping piece, said bowed piece being positioned so that upon being flattened, a portion thereof moves closer to said flange.

8. A conduit coupling according to claim 7 wherein a shallow groove is formed in a portion of said sleeve adjacent said flange and diametrically opposite said clamping piece.

9. A device for coupling a conduit to an apertured plate comprising a sleeve for receiving said conduit in the bore thereof, one end of said conduit extending into the aperture of said plate, a radial flange formed on said sleeve adjacent one face of said plate, a shallow groove formed around a portion of said sleeve adjacent said flange for receiving a portion of the edge of said aperture, and locking means carried by the grooved end of said sleeve and on the opposite side thereof from said grooved portion for locking said sleeve to said plate.

ALBERT J. WAYMAN.

REFERENCES CITED

The following references are of record in the file of this patent:

UNITED STATES PATENTS

| Number | Name | Date |
| --- | --- | --- |
| Re. 18,634 | Thomas | Oct. 18, 1932 |
| 929,543 | Bonnell | July 27, 1909 |